United States Patent
Fodor et al.

(10) Patent No.: US 11,696,330 B2
(45) Date of Patent: Jul. 4, 2023

(54) NETWORK NODE, WIRELESS DEVICE AND METHODS FOR HANDLING INTERFERENCE

(71) Applicant: Telefonaktiebolaget LM Ericsson (publ), Stockholm (SE)

(72) Inventors: Gabor Fodor, Hässelby (SE); Osama Al-Saadeh, Kista (SE); Chrysostomos Koutsimanis, Jersey City, NJ (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 52 days.

(21) Appl. No.: 16/612,444

(22) PCT Filed: May 31, 2017

(86) PCT No.: PCT/SE2017/050583
§ 371 (c)(1),
(2) Date: Nov. 11, 2019

(87) PCT Pub. No.: WO2018/222096
PCT Pub. Date: Dec. 6, 2018

(65) Prior Publication Data
US 2020/0205197 A1 Jun. 25, 2020

(51) Int. Cl.
*H04W 74/08* (2009.01)
*H04L 5/00* (2006.01)
(Continued)

(52) U.S. Cl.
CPC ....... *H04W 74/0816* (2013.01); *H04L 5/0073* (2013.01); *H04W 72/21* (2023.01); *H04W 72/541* (2023.01); *H04L 2101/622* (2022.05)

(58) Field of Classification Search
CPC . H04W 16/14; H04W 24/08; H04W 72/0413; H04W 72/082; H04W 74/0808;
(Continued)

(56) References Cited

U.S. PATENT DOCUMENTS

| 2002/0071448 A1* | 6/2002 | Cervello | H04W 74/0816 370/445 |
| 2003/0152086 A1* | 8/2003 | El Batt | H04W 74/0816 370/400 |

(Continued)

FOREIGN PATENT DOCUMENTS

| WO | 2010057540 A1 | 5/2010 |
| WO | 2017067176 A1 | 4/2017 |

OTHER PUBLICATIONS

Messer, H. et al., "Simultaneous Spatial Separation and Direction-of-Arrival Estimation of Wideband Sources Using Bootstrapped Algorithms", IEEE Transactions on Circuits and Systems-II: Analog and Digital Signal Processing, vol. 43 No. 4, Apr. 1, 1996, pp. 316-328, IEEE.

(Continued)

*Primary Examiner* — Benjamin H Elliott, IV
*Assistant Examiner* — Prince A Mensah
(74) *Attorney, Agent, or Firm* — Coats & Bennett, PLLC

(57) ABSTRACT

A network node (300), a wireless device (304) and methods therein, for handling interference in a wireless network where a Listen-Before-Talk, LBT, scheme is employed to control transmissions. The network node (300) determines whether a first wireless device (302) is compatible with a second wireless device (304) at a serving network node (300) so that uplink signals transmitted (3:1A, 3:2A) from the wireless devices (302, 304) are spatially separable at the serving network node (300). An LBT-related message is then transmitted (3:4A) to the first wireless device (302), which message indicates that the wireless devices (302, 304) are compatible or incompatible at the serving network node (300). The second wireless device (304) is then able to detect (3:4A), i.e. overhear, the LBT-related message and use it as a basis for deciding (3:5) whether to perform a transmission or not. The second wireless device (304) can thus decide to (Continued)

transmit when the compatibility information indicates that the wireless devices (302, 304) are compatible, or refrain from transmission when the compatibility information indicates that the wireless devices (302, 304) are incompatible.

18 Claims, 5 Drawing Sheets

(51) Int. Cl.
*H04W 72/21* (2023.01)
*H04W 72/541* (2023.01)
*H04L 101/622* (2022.01)

(58) Field of Classification Search
CPC ............. H04W 74/0816; H04W 72/21; H04W 72/541; H04L 5/0071; H04L 5/0073; H04L 5/0075; H04L 5/0078; H04L 5/0082; H04L 5/0083; H04L 2101/622
See application file for complete search history.

(56) References Cited

U.S. PATENT DOCUMENTS

| | | |
|---|---|---|
| 2005/0075142 A1 | 4/2005 | Hoffmann et al. |
| 2010/0232414 A1 | 9/2010 | Jeon |
| 2010/0329178 A1 | 12/2010 | Cordeiro |
| 2012/0243485 A1 | 9/2012 | Merlin et al. |
| 2014/0301351 A1* | 10/2014 | Gao ..................... H04W 16/14 370/329 |
| 2015/0208439 A1 | 7/2015 | Cheong et al. |
| 2016/0301492 A1 | 10/2016 | Wilhelmsson et al. |
| 2017/0181189 A1* | 6/2017 | Luo ..................... H04W 74/002 |
| 2017/0290048 A1* | 10/2017 | Amuru ............. H04W 72/0446 |
| 2018/0054835 A1* | 2/2018 | Fodor ............... H04W 74/0816 |
| 2018/0098355 A1* | 4/2018 | Islam .................... H04W 24/08 |
| 2018/0124790 A1* | 5/2018 | Yerramalli ............ H04W 16/14 |
| 2018/0242331 A1 | 8/2018 | Zhu et al. |

OTHER PUBLICATIONS

Moghadam, N. et al., "Pilot Precoding and Combining in Multiuser MIMO Networks", IEEE Journal on Selected Areas in Communications, vol. 35 No. 7, Jul. 1, 2017, pp. 1-14, IEEE.

Yin, H. et al., "A Coordinated Approach to Channel Estimation in Large-Scale Multiple-Antenna Systems", IEEE Journals on Selected Areas in Communications, vol. 31 No. 2, Feb. 1, 2013, pp. 264-273, IEEE.

\* cited by examiner

NETWORK NODE, WIRELESS DEVICE AND METHODS FOR HANDLING INTERFERENCE

TECHNICAL FIELD

The present disclosure relates generally to a network node, a wireless device and methods therein, for handling interference in a wireless network where a Listen-Before-Talk, LBT, scheme is employed to control transmissions.

BACKGROUND

In this disclosure, the term "wireless device" is used to represent any communication entity capable of radio communication with a wireless network by sending and receiving radio signals to/from a network node of the wireless network. The wireless devices discussed herein may be mobile telephones, tablets, laptop computers and Machine-to-Machine, M2M, devices, also known as Machine Type Communication, MTC, devices. Another common generic term in this field is "User Equipment, UE" which could be used herein as a synonym for wireless device.

The wireless network typically comprises a number of network nodes which are operable to communicate radio signals with wireless devices over a radio interface. Depending on the type of network and terminology used, a network node of a wireless network may be referred to as a base station, radio node, E-UTRAN Node B, eNB, base transceiver station, access point, etc. In this disclosure, the term "network node" is used without limitation to any particular type of wireless network.

It has been suggested in the Third Generation Partnership project, 3GPP, that contention-based uplink transmission can be employed by wireless devices instead of requiring a scheduling request and a following scheduling grant for each communication, thus omitting the otherwise used access reservation process which can be both energy consuming and resource consuming. Some examples of how contention-based uplink transmissions can be employed are described in WO 2010057540 A1.

Contention-based uplink transmission means that any wireless device can transmit data and messages to a network node on a shared radio channel or carrier without reserving radio resources in advance, at the risk of collision when two or more wireless devices happen to transmit simultaneously such that the network node is not able to decode the transmissions. To avoid such collisions the wireless devices are typically configured to first sense, i.e. "listen to", the radio channel or carrier and wait until it is "idle", that is free from transmissions, thus detecting that the radio channel or carrier is not "busy", before transmitting. This procedure is also referred to as Listen Before Talk, LBT, which term will be used throughout this disclosure. Another commonly used term in this context is "Carrier Sensing", CS, which is thus equivalent to LBT.

The shared radio channel or carrier, also known as the shared medium, is typically defined as a certain frequency band which is generally available for radio transmissions. In this disclosure, the term "carrier" will be used although channel or medium could also be used herein. For example, the shared carrier may be comprised in an unlicensed band. Further, sensing or "hearing" that the carrier is free from transmissions basically means that no ongoing transmissions can be detected that might cause interference to, or be interfered by, a transmission by the wireless device.

In LBT, it is sometimes a problem that a wireless device may sense the shared carrier as being free, i.e. no ongoing potentially interfering transmissions can be heard or noticed by the wireless device, while another wireless device might transmit which is not heard by the first device. This problem is sometimes referred to as the "hidden node problem". In this case the first device may decide to transmit to its serving network node even though the second device may cause interference at the network node. Accordingly, a hidden node or transmitter refers to a transmitter node that causes interference at the intended receiver of another transmission.

Another problem is that a wireless device may sense the shared carrier as being busy by hearing an ongoing transmission from another wireless device which however would not cause interference at the first device's serving network node. As a result, the first wireless device decides to wait instead of transmitting, thus missing an opportunity to perform a transmission that would not be the victim of interference when received at the receiving network node. This problem is sometimes referred to as the "exposed node problem". Accordingly, an exposed node or transmitter refers to a transmitter node that refrains from transmission although its intended receiver node is free from interference.

FIG. 1 illustrates a communication scenario in a wireless network where the hidden node problem occurs when LBT is employed. A first wireless device 100 senses the carrier as being free from transmissions and therefore decides to transmit data to a serving network node 102. At the same time, a second wireless device 104 is transmitting to a neighboring network node 106 which will cause interference at the network node 102 to the transmission from wireless device 100. The second wireless device 104 is thus hidden in the sense of not being heard by the first wireless device 100 since devices 100 and 104 are located sufficiently far from each other, in this case at opposite sides of the network node 102 where the interference occurs.

FIG. 2 illustrates another communication scenario where the exposed node problem occurs when LBT is employed. A first wireless device 200 served by a network node 202 senses the carrier as being busy by hearing a transmission from a second wireless device 204 to another network node 206. The transmission from device 204 is thus well heard by device 200 since devices 200 and 204 are located relatively close to each other. However, the second wireless device 204 is located sufficiently far from the network node 202 that is serving device 200, meaning that its transmission would not interfere with a transmission from the first wireless device 200 at the network node 202. Still, the first wireless device 200 refrains from transmission since it senses the carrier as being busy.

In the two examples described above, unwanted and potentially harmful interference occurs in FIG. 1, while transmission is delayed and capacity of the shared carrier may be under-utilized in FIG. 2. In both cases, performance and/or data throughput may be reduced when using the shared carrier.

SUMMARY

It is an object of embodiments described herein to address at least some of the problems and issues outlined above. It is possible to achieve this object and others by using a method and a node as defined in the attached independent claims.

According to one aspect, a method is performed by a network node for handling interference in a wireless network where a Listen-Before-Talk, LBT, scheme is employed to control transmissions. In this method the network node determines whether a first wireless device being served by a serving network node is compatible with a second wireless device at the serving network node so that uplink signals transmitted from the first and second wireless devices are spatially separable at the serving network node. The network node then initiates transmission of an LBT-related message to the first wireless device, the LBT-related message comprising compatibility information indicating that the first and second wireless devices are compatible or incompatible at the serving network node, as a basis for the second wireless device to decide whether to perform a transmission or not.

According to another aspect, a network node is arranged to handle interference in a wireless network where an LBT scheme is employed to control transmissions. The network node is configured to determine whether a first wireless device being served by a serving network node is compatible with a second wireless device at the serving network node so that uplink signals transmitted from the first and second wireless devices are spatially separable at the serving network node. The network node is also configured to initiate transmission of an LBT-related message to the first wireless device, the LBT-related message comprising compatibility information indicating that the first and second wireless devices are compatible or incompatible at the serving network node, as a basis for the second wireless device to decide whether to perform a transmission or not.

According to another aspect, a method is performed by a wireless device for handling interference in a wireless network where an LBT scheme is employed to control transmissions. In this method the wireless device detects an LBT-related message transmitted by a serving network node to another wireless device being served by the serving network node, the LBT-related message comprising compatibility information indicating that said wireless device and the other wireless device are compatible or incompatible at the serving network node. The wireless device then decides to perform a transmission when the compatibility information indicates that said wireless devices are compatible at the serving network node, or decides to refrain from transmission when the compatibility information indicates that said wireless devices are incompatible at the serving network node.

According to another aspect, a wireless device is arranged to handle interference in a wireless network where an LBT scheme is employed to control transmissions. The wireless device is configured to detect an LBT-related message transmitted by a serving network node to another wireless device being served by the serving network node, the LBT-related message comprising compatibility information indicating that said wireless device and the other wireless device are compatible or incompatible at the serving network node.

The wireless device is further configured to decide to perform a transmission when the compatibility information indicates that said wireless devices are compatible, or decide to refrain from transmission when the compatibility information indicates that said wireless devices are incompatible.

Advantages that can be achieved include that the wireless device that overhears the LBT-related message can decide to transmit without causing interference at the network node in case uplink signals from that device and the other wireless device are spatially separable at the network node, even if the carrier is sensed as being busy. Another advantage is that the overhearing wireless device will not transmit when there is a risk for interference at the network node because uplink signals from the two devices are not spatially separable at the network node, even if the carrier is sensed as being free.

The above network node, wireless device and methods therein may be configured and implemented according to different optional embodiments to accomplish further features and benefits, to be described below.

A computer program is also provided which comprises instructions which, when executed on at least one processor, cause the at least one processor to carry out either of the methods described above. A carrier containing the above computer program is further provided, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
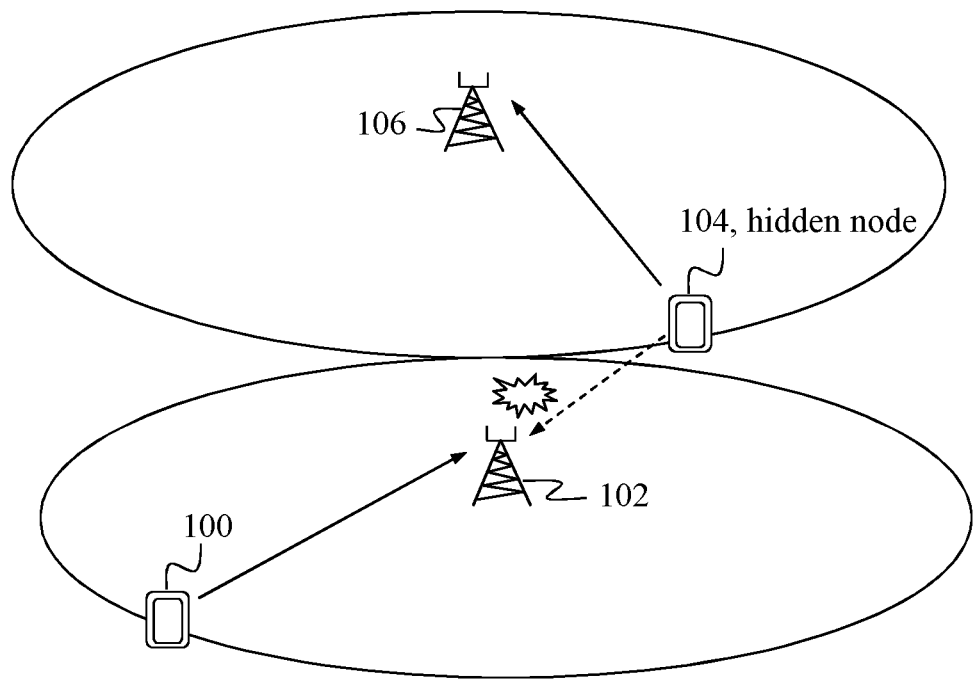
FIG. 1 is a communication scenario illustrating how interference may occur when LBT is employed, according to the prior art.
Figure 2:
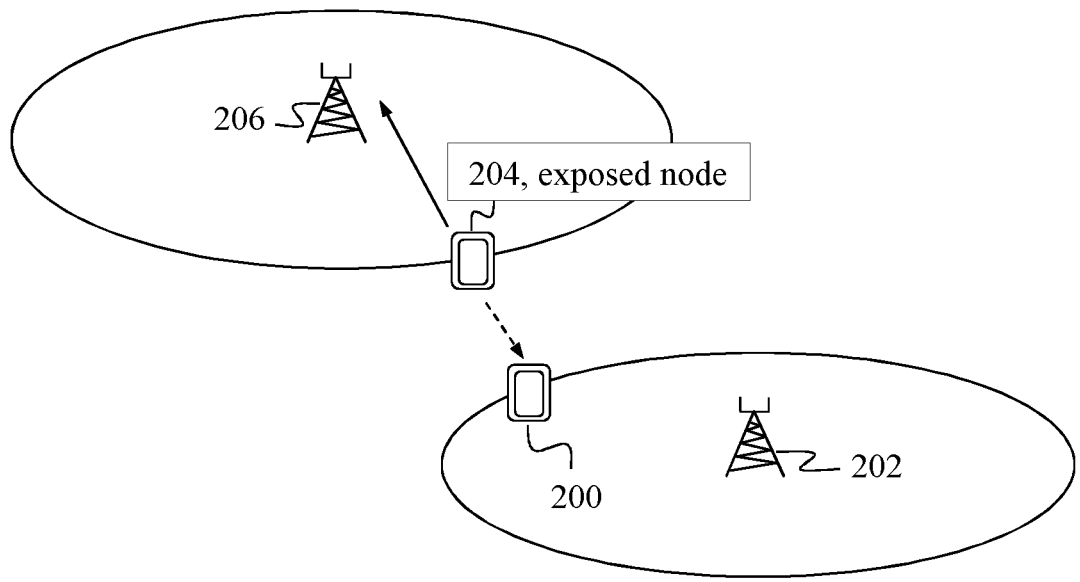
FIG. 2 is a communication scenario illustrating how a transmission opportunity may be missed when LBT is employed, according to the prior art.

Briefly described, a solution is provided that can potentially increase efficiency and avoid interference in a wireless network where LBT is employed. This can be accomplished by functionality in a network node which includes determining whether uplink signals transmitted at the same time from a served wireless device and from another wireless device are spatially separable at that network node. If so, the two wireless devices are considered to be "compatible" at the network node in the sense that their uplink signals can be received more or less simultaneously and decoded individually by the network node by means of spatial separation of the respective uplink signals.

When the network node transmits an LBT-related message to the served wireless device, compatibility information is included in the LBT message indicating that the served wireless device and the other wireless device are either compatible or incompatible at the serving network node in terms of spatial separation. Thereby, the other wireless device is able to intercept, i.e. overhear, the LBT message and by reading the compatibility information therein that wireless device can see if it is compatible or incompatible at the network node that transmitted the message, and use this information as a basis to decide whether to perform a transmission itself or not.

It is an advantage that the latter "other" wireless device can decide to transmit without causing interference at the network node in case the two devices are spatially separable, even if the carrier is sensed as being busy, and conversely that the other wireless device will not transmit when there is a risk for interference because the two devices are not spatially separable, even if the carrier is sensed as being free. Thereby, both of the above-described hidden node and exposed node problems can be addressed by using the solution described herein. The compatibility information in the LBT-related message may also indicate the served wireless device's compatibility with more than one other wireless device, so that each of those other wireless devices can potentially intercept the LBT message and find out whether it is compatible or incompatible with any other wireless device(s) at the network node.

In this disclosure, a wireless device "overhearing" a message basically implies that the wireless device is able to receive and read the message although it is addressed to another receiver and not to that wireless device. Further, it is assumed that the network node is capable of determining whether the two wireless devices are spatially separable or not based on uplink signals such as reference signals that the wireless devices are configured to transmit according to regular procedures.

For example, the network node may estimate an Angle-of-Arrival (AoA) when receiving the respective reference signals, and if the AoA of the two devices' uplink signals are sufficiently different from one another, the signals are deemed to be spatially separable in the sense that the network node would be able to receive and decode the signals individually depending on their AoA. Signal separation based on AoA will be discussed in more detail later below. Another term used in this field is Direction of Arrival (DoA) which corresponds to AoA although the latter term is used throughout this disclosure for consistency.

The solution and its embodiments described herein involve a network node and a first wireless device that is currently being served by the network node which will therefore be referred to as the serving network node. A second wireless device is also involved which may not be served by the same network node although it is also possible that the two wireless devices are served by the same network node, and the solution is not limited in this respect.

An example of how the solution may be employed in a wireless network where an LBT scheme is employed to control transmissions on a shared carrier, will now be described with reference to the signaling diagram in FIG. 3 where a network node 300 is shown as a single entity that could be implemented in a base station or similar. It is also possible to implement the network node 300 in a distributed manner, as shown in FIG. 3A, to include one entity 300A that handles communication of radio signals, here referred to as a "serving network (NW) node", and another entity 300B that performs logical operations as described herein, here referred to as a "control node". The control node 300B may e.g. be implemented in a centralized node that controls a number of network nodes including the serving NW node 300A. For example, the serving NW node 300A may alternatively be called a radio part of the network node 300 and the control node 300B may be called a logic part of the network node 300.

It is assumed that the uplink transmissions mentioned in this disclosure are performed on a "shared carrier" or similar, which is thus available for use by any wireless devices, with the risk for collision when two or more transmissions are performed on the carrier at the same time. In FIG. 3A, a first action 3:1A illustrates that a first wireless device 302 transmits reference signals and an action 3:16 illustrates that the network node 300 basically detects said reference signals and determines their AoA. Similarly, another action 3:2A illustrates that a second wireless device 304 likewise transmits reference signals and an action 3:2B illustrates that the network node 300 detects those reference signals and determines their AoA as well.

In general, wireless devices are required to regularly transmit uplink reference signals such as sounding reference signals and/or demodulation reference signals, which signals may include a physical cell identity and a device identity or other information from which a detecting network node can determine the unique identity of the transmitting wireless device. In addition, a wireless device may also periodically send Medium Access Control (MAC) packets that contain device identity information. Such MAC packets may be used by both serving and neighbor network nodes to (1) determine the identity of devices that are at a cell edge area in neighbor cells, and (2) estimate the AoA of such wireless devices.

The network node 300 then compares the AoA of the respective reference signals of the first and second wireless devices 302, 304, as shown in an action 3:3, in order to determine whether the wireless devices 302, 304 are compatible or not at the network node 300, that is in terms of spatial separation of their uplink signals as described above. As mentioned above, if the estimated AoAs of the wireless devices 302, 304 are sufficiently different from one another, they are spatially separable and the network node 300 will be able to receive and decode uplink signals from the wireless devices 302, 304 individually, meaning that the signals will not interfere with each other at the network node 300.

When the wireless devices 302, 304 have been determined to be either compatible or incompatible at the network node 300, this information is saved at the network node 300 for use when it is time to transmit an LBT-related message to the first wireless device 302. It will now be described how LBT and LBT-related messages can be employed in general.

A mechanism that can be used to enable licensed assisted access (LAA) and operation in unlicensed bands is the above-mentioned LBT scheme. LBT thus controls when a shared carrier can be used for downlink transmission and when it is permitted for wireless devices to transmit in the uplink. According to current regulations, wireless devices are required to postpone transmission until the shared carrier is considered clear, i.e. free from other transmissions. When a wireless device only relies on its own ability to sense the carrier, as described above in the Background section, the hidden and exposed node problems may occur which can be addressed by the solution described herein.

One existing way of avoiding or reducing these problems is the handshaking MAC protocol that involves the messages called Request-to-Send (RTS) and Clear-to-Send (CTS). The RTS and CTS messages between the transmitter and intended receiver nodes can help other nodes to detect an imminent transmission and identify the intended receiver of a nearby communicating node pair. An improvement of the RTS/CTS protocol is the addition of the message called Request-for-Request-To-Send (RRTS). The potential receiver node, which has not responded with a CTS message to a number of subsequent RTS messages from a potential transmitter, can transmit the RRTS message to notify the transmitter about a transmission opportunity. Thus, with the RRTS message, the potential receiver helps the transmitter to know that sending a RTS message will have a high probability to result in a CTS response from the receiver. Although the RTS/CTS handshaking protocol does not completely eliminate the exposed/hidden node problems, it can reduce the probability for packet collision in many deployment situations and is widely used in networks employing LBT.

Returning to FIG. 3, the network node 300, at some point, transmits an LBT-related message to the first wireless device 302, in an action 3:4A, which message comprises compatibility information indicating whether the first and second wireless devices 302, 304 are compatible or incompatible at the network node 300. It was mentioned above that if the estimated AoAs of the wireless devices 302, 304 are sufficiently different from one another, such as when the AoA difference exceeds a predefined threshold, uplink signals from the first and second wireless devices 302, 304 can be considered to be spatially separable at the network node 300. This threshold may be configurable, e.g. depending on its receiver's capability of separating signals with different AoAs. If the receiver in the network node is capable of separating received signals even when their AoAs are relatively similar the threshold can be set low, while when the receiver is less capable of signal separation the threshold should be set higher.

Another action 3:4B indicates that the LBT-related message transmitted in action 3:4A is detected, i.e. overheard, by the second wireless device 304 which is thereby able to read the compatibility information in the LBT message. In a next action 3:5, the second wireless device 304 decides whether to perform a transmission or not, depending on the compatibility information in the LBT message. A final action 3:6 indicates that the second wireless device 304 will transmit when the compatibility information indicates that the wireless devices 302, 304 are compatible, or that the second wireless device 304 will refrain from transmission when the compatibility information indicates that the wireless devices 302, 304 are incompatible at the serving network node 300.

FIG. 3A illustrates how some of the above procedure can be executed in case the network node 300 is implemented as two distributed entities, the serving NW node 300A and the control node 300b. The second wireless device 304 is not shown here for simplicity. In this figure, the above described actions 3:1B and 3:2B of detecting reference signals and measuring their AoA are schematically indicated as being performed by the serving NW node 300A. An additional action 3:2C illustrates that the serving NW node 300A sends the measured AoAs to the control node 300B for evaluation. The control node 300B then performs the above-described action 3:3 of comparing the AoAs to see if the wireless devices 302, 304 are compatible or not at the network node 300. In a further action 3:3A, the control node 300B initiates, or triggers, the serving NW node 300A to transmit the LBT-related message as of the above-described action 3:4A with compatibility information resulting from the comparing action 3:3.

An example will now be described with reference to the flow chart in FIG. 4, of how the solution may be employed in terms of actions performed by a network node such as the above-described network node 300. FIG. 4 is described below with further reference to FIGS. 3 and 3A. Some optional example embodiments that could be used in this procedure will also be described below. This procedure may be employed when the network node 300 is operating in a wireless network 204 which may be of any type and any suitable protocols and standards for communication may be employed in this network.

The actions in this procedure may be performed for handling interference in a wireless network where a Listen-Before-Talk, LBT, scheme is employed to control transmissions. A first action 400 illustrates that uplink signals transmitted from a first wireless device 302 and uplink signals transmitted from a second wireless device 304 may first be detected at the network node 300 which is currently serving the first wireless device 302, herein referred to as the serving network node 300, or 300A in the case of distributed implementation. In this detecting operation, an Angle-of-Arrival (AoA) at the serving network node 300 may be estimated, or measured, for the first and second wireless devices 302, 304, respectively.

In general, network nodes may be equipped with multiple transmit/receive antennas, while wireless devices are either equipped with a single antenna or a limited number of transmit/receive antennas, e.g. 2, 4 and up to 16. The wireless devices with multiple antennas are able to beamform its transmitted signals, both data and reference signals. The beamwidth and sidelobes of the signals basically depend on the number of transmit antennas, channel state information available at the wireless device, its device capabilities and the surrounding environment for signal propagation, including distribution of scattering and shadowing objects, etc.

Some wireless devices may be equipped with multiple transmit antennas and are capable of beamforming the uplink signals. Thereby, the dominant AoAs are confined to spatially restricted domains, and their respective serving network nodes may use their multiple antenna receiving capabilities to spatially separate the received signals.

Another action 402 illustrates that the AoA of the respective first and second wireless devices 302, 304 at the serving network node 300 may also be compared in order to determine how different they are which is an indication of whether signals from the first and second wireless devices 302, 304 are spatially separable or not at the serving network node 300. The relationship between AoA difference and spatial separation has been explained above.

An action 404 then illustrates that it is determined whether the first wireless device 302 being served by the serving network node 300 is compatible with the second wireless device 304 at the serving network node 300 so that uplink signals transmitted from the first and second wireless devices 302, 304 are spatially separable at the serving network node 300. As mentioned above, this can be determined by comparing the AoA for the uplink signals from the first and second wireless devices 302, 304. If their respective AoAs are sufficiently different from each other, e.g. when the AoA difference exceeds some predefined threshold, it can be presumed that the first and second wireless devices 302, 304 are spatially separable at the serving network node 300. On the other hand, If their AoA are too similar, e.g. when the AoA difference is below the threshold, it can be presumed that the first and second wireless devices 302, 304 are not spatially separable at the serving network node 300.

In a following action 406, transmission of an LBT-related message from the serving network node 300 to the first wireless device 302 is initiated, either by performing the actual transmission or by triggering a radio part in the serving network node 300 to transmit the message. The LBT-related message comprises compatibility information which indicates that the first and second wireless devices 302, 304 are compatible or incompatible at the serving network node 300. This compatibility information in the transmitted LBT-related message can then be detected, i.e. overheard", by the second wireless device 304 and used by the second wireless device 304 as a basis to decide whether to perform a transmission itself or not.

Some further embodiments and examples of how the above procedure in FIG. 4 may be realized, will now be outlined. In one example embodiment, the LBT-related message may be a Clear-To-Send, CTS, message or a Request for Request-To-Send, RRTS, message of a Medium Access Control, MAC, protocol, which messages have been described above. These types of messages may be detected, i.e. overheard, by the second wireless device 304 and used in the manner described herein, even though the LBT-related message is directed to the served and not to the second wireless device 304 which may or may not be served by the same network node as the first device 302.

In another example embodiment, the determining in action 404 may be performed after detecting uplink signals transmitted from the first wireless device 302 and uplink signals transmitted from the second wireless device, said detecting being illustrated by action 400. In another example embodiment, the determining in action 404 may be performed by comparing an Angle-of-Arrival, AoA, for the detected uplink signals transmitted from the first and second wireless devices 302 and 304, respectively. It has been described above how such comparing may be done.

In further example embodiments, the detected uplink signals may include reference signals such as Sounding Reference Signals, SRSs, and/or Demodulation Reference Signals, DRSs, transmitted by the first and second wireless devices 302, 304.

In another example embodiment, the determining in action 404 may be performed when received power of the uplink signals transmitted from the second wireless device 304 is above a predefined power threshold. If the received power of signals from device 304 is below the power threshold, such signals may be considered "harmless" in the sense that they will not cause any harmful interference if colliding with other simultaneous signals. It would therefore not be necessary to evaluate any AoA of the uplink signals from device 304. A more detailed procedure of how this may be handled will be described below with reference to FIG. 6.

In another example embodiment, the first and second wireless devices 302, 304 may be served in different cells, such that the second wireless device 204 is served by a network node different from network node 300, although the solution may also be applied when they are served by the same network node.

In another example embodiment, the compatibility information may indicate explicitly that the first and second wireless devices 302, 304 are incompatible at the serving network node 300. In this case, the compatibility information would include an explicit indication of incompatibility when the wireless devices 302, 304 are not compatible and no explicit indication when they are compatible. Thereby, the lack of an explicit indication of incompatibility is considered as an implicit indication of compatibility.

In another example embodiment, a compatibility matrix may be created and maintained at the serving network node 300, which compatibility matrix indicates whether different pairs of wireless devices are compatible or incompatible at the serving network node 300. Such a compatibility matrix may be updated whenever uplink signals can be detected from a new wireless device, and whenever uplink signals can no longer be detected from a wireless device present in the compatibility matrix by adding and deleting, respectively, the wireless devices. The compatibility matrix can thus be kept up-to-date on a more or less dynamic basis, depending on detected uplink signals. Any LBT-related message with compatibility information to be transmitted to a wireless device, may thus be created based on information in the compatibility matrix by indicating that device's compatibility with other devices in the compatibility matrix.

In another example embodiment, the above-described compatibility matrix may be maintained based on reference signals transmitted periodically by the wireless devices. This way, the compatibility matrix can include compatibility information regarding all wireless devices from which uplink signals can be detected at the network node 300. Compatibility and/or incompatibility of the wireless devices may thus be indicated pair-wise in the compatibility matrix.

Figure 5:
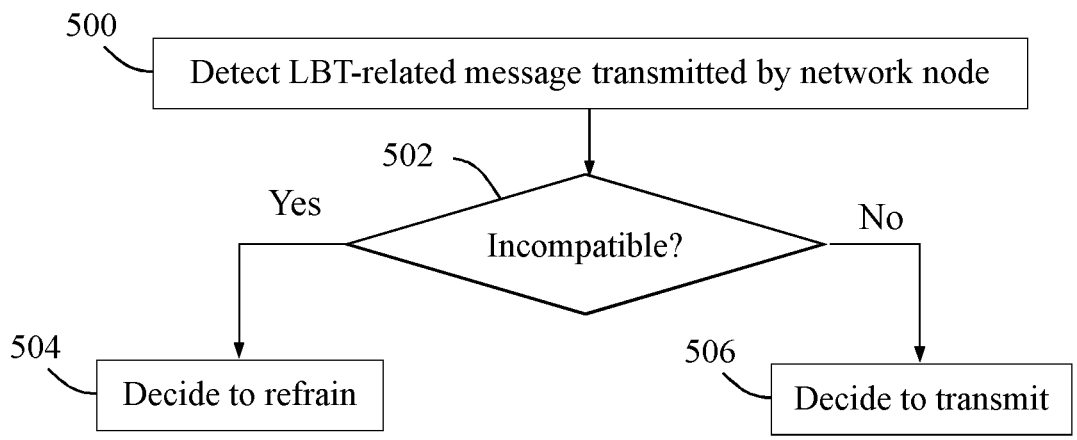
FIG. 5 is a flow chart illustrating a procedure in a wireless device, according to further example embodiments.

An example will now be described, with reference to the flow chart in FIG. 5, of how the solution may be employed in terms of actions performed by a wireless device such as the second wireless device 304 in FIG. 3. FIG. 5 is described below likewise with further reference to FIG. 3. Some optional example embodiments that could be used in this procedure will also be described below.

Figure 3:
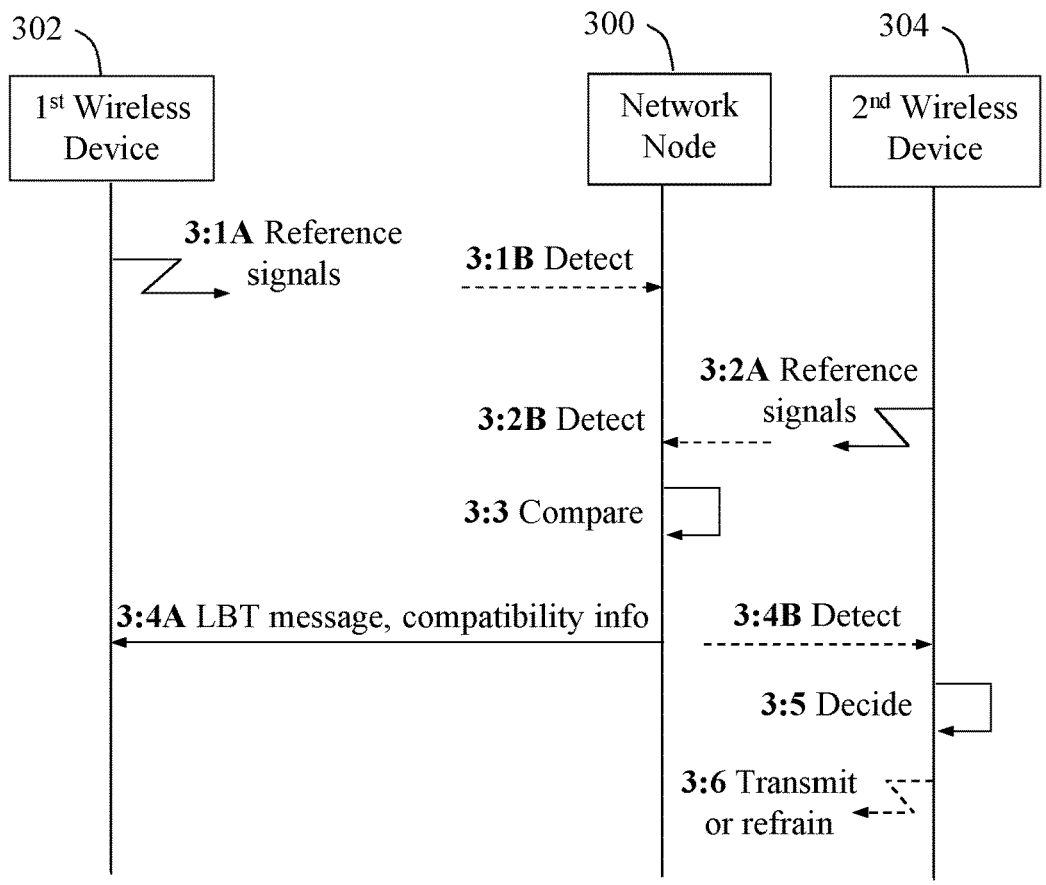
FIG. 3 is a signaling diagram illustrating an example of a procedure when the solution is used, according to further example embodiments.
Figure 3A:
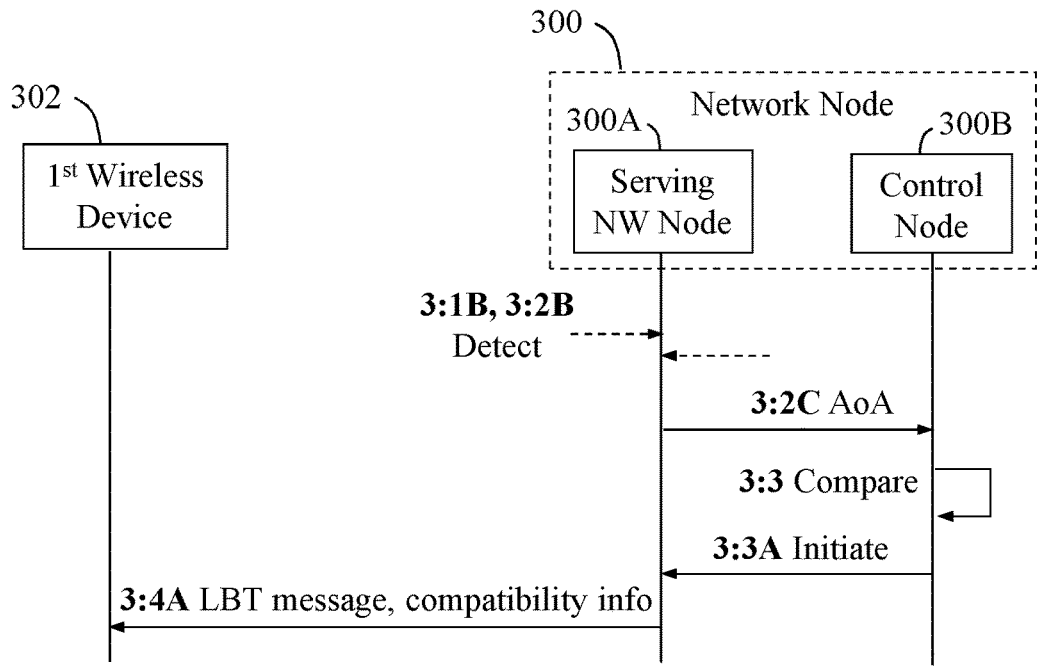
FIG. 3A is a signaling diagram illustrating a part of the procedure in FIG. 3 when the network node is implemented in a distributed manner, according to further example embodiments.
Figure 4:
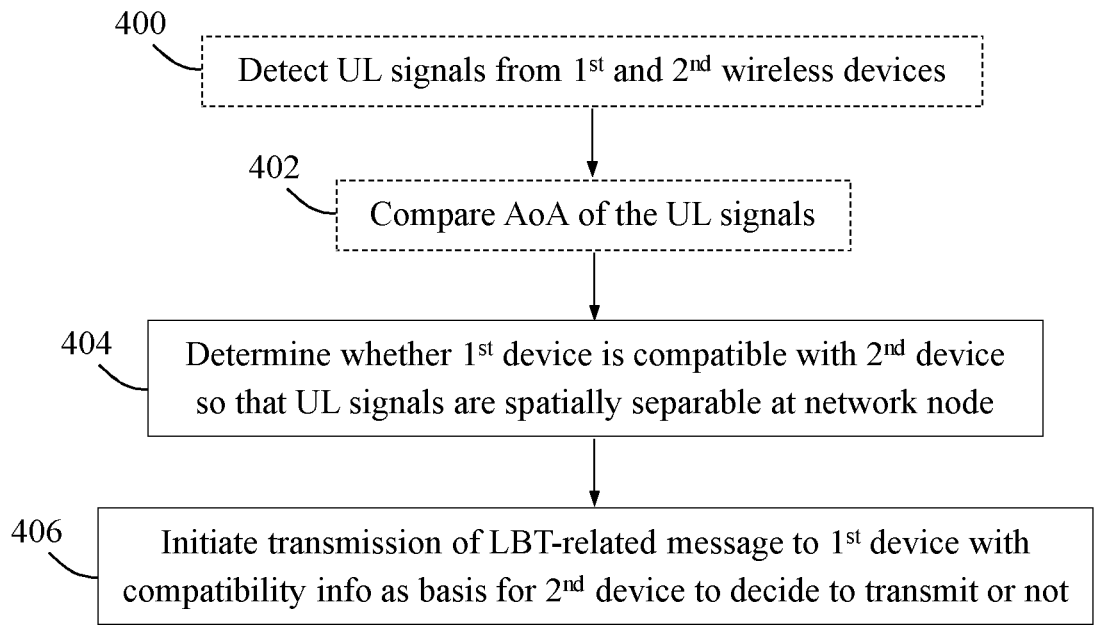
FIG. 4 is a flow chart illustrating a procedure that may be performed by a network node, according to further example embodiments.

The wireless device in this procedure corresponds to the second wireless device 304 mentioned in the description of FIGS. 3 and 4. In FIG. 5, the wireless device 304 operates to handle interference in a wireless network where a Listen-Before-Talk, LBT, scheme is employed to control transmissions. A first action 500 illustrates that the wireless device 304 detects an LBT-related message transmitted by a serving network node 300 to another wireless device 302 being served by the serving network node 300. The other wireless device 302 in this procedure thus corresponds to the first wireless device 302 described above.

The LBT-related message detected in action 500 comprises compatibility information indicating that said wireless device 304 and the other wireless device 302 are compatible or incompatible at the serving network node 300. Action 500 corresponds to actions 3:4A and 406 and the LBT-related message has been described in detail above.

In an example embodiment, the LBT-related message is a Clear-To-Send, CTS, message or a Request for Request-To-Send, RRTS, message of a Medium Access Control, MAC, protocol. In another example embodiment, the wireless devices 302, 304 may be served in different cells. In another example embodiment, the compatibility information may indicate explicitly that the wireless devices 302, 304 are incompatible at the serving network node 300. The latter embodiments of FIG. 5 correspond to some of the embodiments of FIG. 4 which have been described above.

In a next action 502, the wireless device 304 determines, from compatibility information in the LBT-related message, whether it is compatible or incompatible with the other wireless device 302 at the serving network node 300. The outcome of this action includes two alternatives as follows. In one action 504, the wireless device 304 decides to perform a transmission when the compatibility information indicates that the two wireless devices 302, 304 are compatible at the serving network node 300. On the other hand, the wireless device 304 decides in another action 506 to refrain from transmission when the compatibility information indicates that the wireless devices 302, 304 are incompatible at the serving network node 300.

When either of the procedures described for FIGS. 4 and 5 is used, it is an advantage that a wireless device can decide to transmit on a shared carrier without causing interference at the network node in case the compatibility information in the detected LBT message indicates that the wireless device is compatible with another wireless device served by the network node, even if the carrier is sensed as being busy. Thereby, an opportunity to transmit can be utilized by the wireless device. It is also an advantage that the wireless device will refrain from transmission in case the compatibility information indicates that it is not compatible with the served wireless device, even if the carrier is sensed as being free, so that no interference will occur. Thereby, both of the above-described hidden node and exposed node problems are addressed by the solution described herein.

Figure 6:
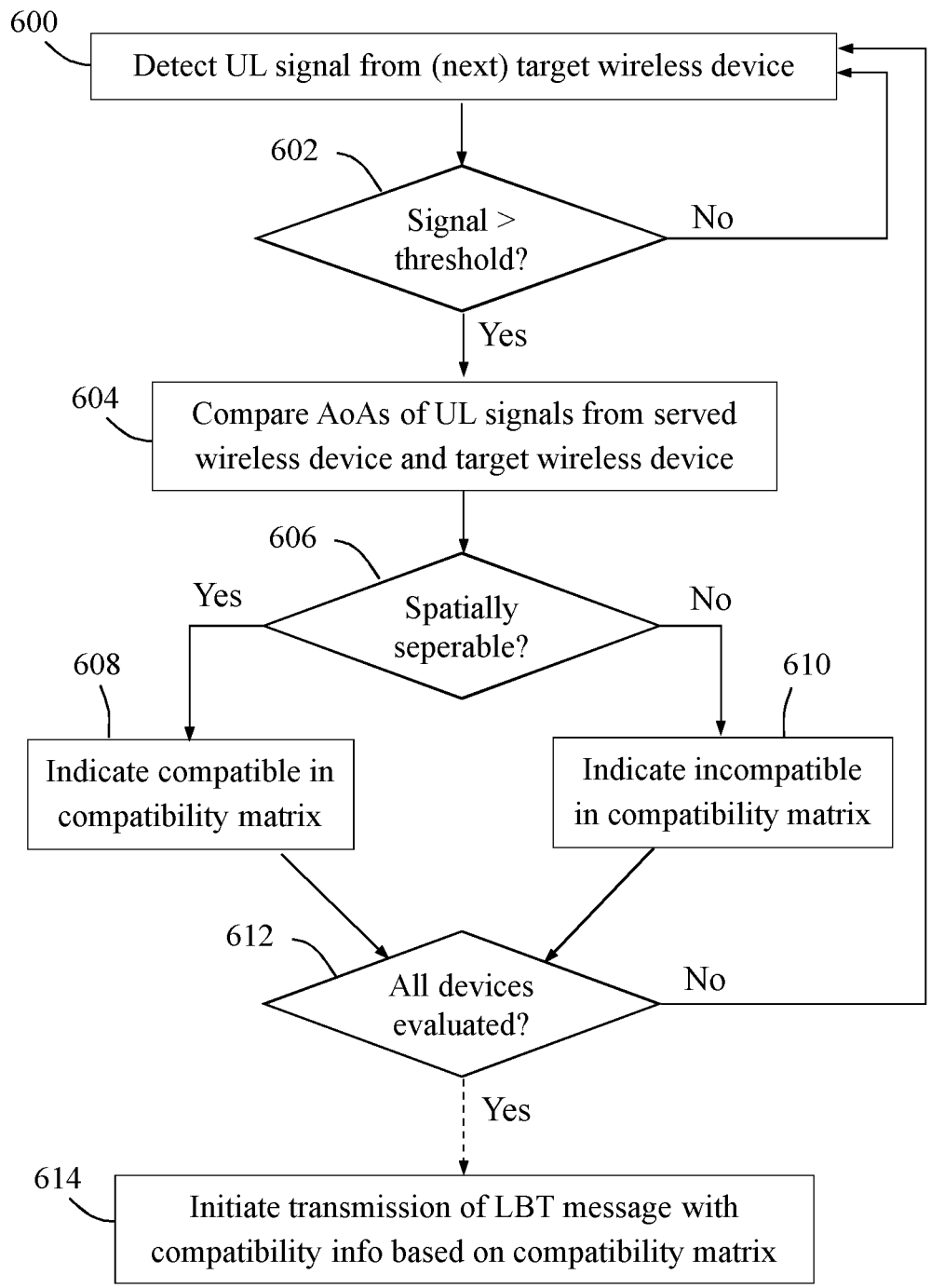
FIG. 6 is a flow chart illustrating an example of how a network node may operate in more detail, according to further example embodiments.

A more detailed example of how the network node 300 may operate when the solution is employed, will now be described with reference to the flow chart in FIG. 6. As in FIG. 4, the first wireless device 302 is served by the network node 300 while the second wireless device 304 is able to detect transmissions by the network node 300. FIG. 6 specifically describes how the above-mentioned compatibility matrix may be created and used by the network node 300.

A first action 600 illustrates that the network node 300 detects an uplink signal, e.g. reference signal, from a target wireless device. It is then checked in a next action 602 whether the detected uplink signal exceeds a power threshold, which has been described above. If not, the target wireless device can be ignored and its signals are not necessary to evaluate with respect to spatial separation relative signals from the first wireless device 302, and the procedure may repeat action 600 by detecting an uplink signal from a next target wireless device.

If it is found in action 602 that a detected uplink signal exceeds the power threshold, the network node 300 moves on to action 604 and compares the AoA of uplink signals from the served wireless device 302 with the AoA of the uplink signal from the present target wireless device, basically in the manner described above for actions 3:3 and 402. It was also described above how the difference in AoA indicates whether the uplink signals are spatially separable or not at the network node 300.

If it is found in an action 606 that the uplink signals from the devices 302 and 304 are spatially separable, the network node 300 indicates in the compatibility matrix that the first wireless device 302 and the present target wireless device are compatible at the network node 300, in an action 608. On the other hand, if it is found in action 606 that the uplink signals from the devices 302 and 304 are not spatially separable, the network node 300 indicates in the compatibility matrix that the wireless devices are incompatible at the network node 300, in an alternative action 610.

The network node 300 then checks in an action 612 whether all wireless devices that transmit detectable uplink signals have been evaluated according to actions 600-610. If not, the procedure returns to action 600 by detecting an uplink signal from a next target wireless device, and so forth. If it is found in action 612 that all wireless devices that transmit detectable uplink signals have been evaluated, the network node 300 is prepared to initiate transmission of an LBT-related message with compatibility information to any served wireless device, such as device 302, in an action 614. This final action can be performed in the manner described above for actions 3:4A and 406.

Figure 7:
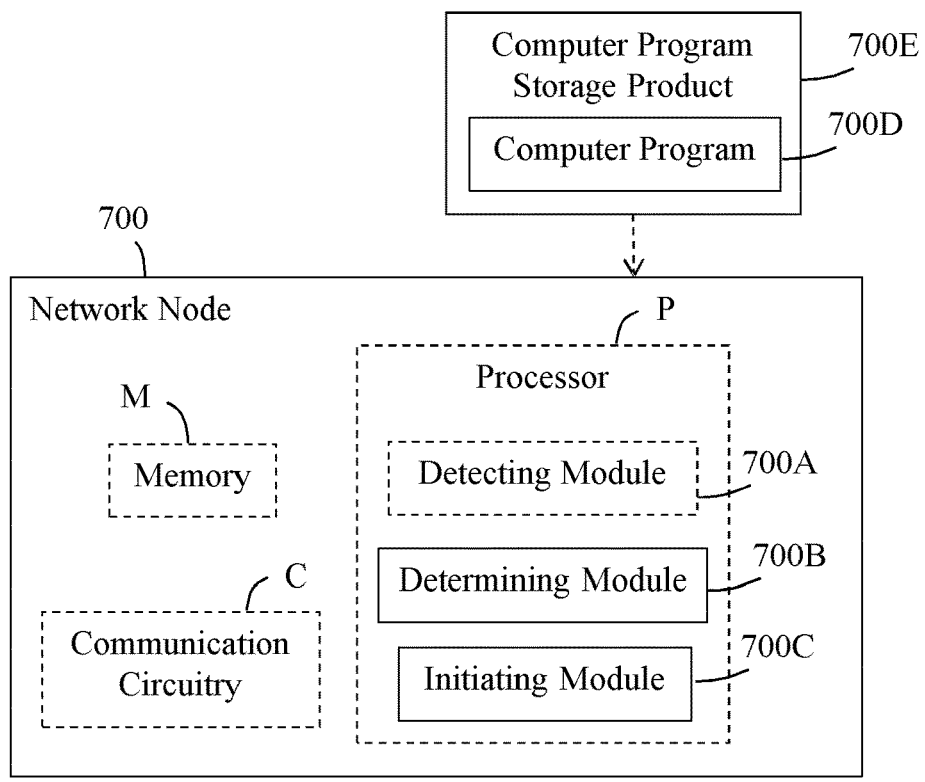
FIG. 7 is a block diagram illustrating how a network node and a wireless device may be structured, according to further example embodiments.
Figure 7:
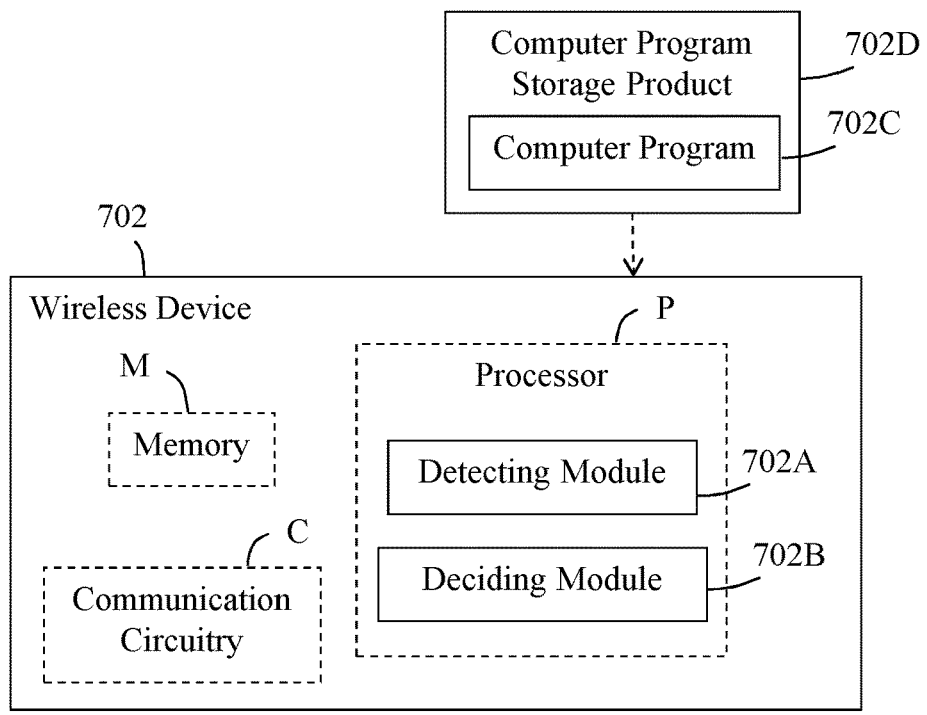

The block diagram in FIG. 7 illustrates a detailed but non-limiting example of how a network node 700 and a wireless device 702, respectively, may be structured to bring about the above-described solution and embodiments thereof. In this figure, the network node 700 and the wireless device 702 may be configured to operate according to any of the examples and embodiments of employing the solution as described herein, where appropriate. Each of the network node 700 and the wireless device 702 is shown to comprise a processor "P", a memory "M" and a communication circuit "C" with suitable equipment for transmitting and receiving radio signals in the manner described herein.

The communication circuit C in each of the network node 700 and the wireless device 702 may thus comprise equipment configured for communication with each other using a suitable protocol for the communication depending on the implementation. The solution is however not limited to any specific types of signals or protocols.

The network node 700 is, e.g. by means of units, modules or the like, configured or arranged to perform at least some of the actions of the flow charts in FIGS. 4 and 6, and as follows. Further, the wireless device 702 is, e.g. by means of units, modules or the like, configured or arranged to perform at least some of the actions of the flow chart in FIG. 5 and as follows.

The network node 700 is arranged to handle interference in a wireless network where a Listen-Before-Talk, LBT, scheme is employed to control transmissions. The network node 700 may be configured to detect uplink signals transmitted from the first wireless device and uplink signals transmitted from the second wireless device, and to determine an AoA of the detected signals. These operations may be performed by a detecting module 700A in the network node 700, and as illustrated in action 400 and/or actions 600, 602.

The network node 700 is configured to determine whether a first wireless device being served by a serving network node is compatible with a second wireless device at the serving network node so that uplink signals transmitted from the first and second wireless devices are spatially separable at the serving network node.

This operation may be performed by a determining module 700B in the network node 700, and as illustrated in action 404. The determining module 700B could alternatively be named a logic module, comparing module or compatibility module. The network node 700 may be further configured to perform said determining by comparing the AoA for the detected uplink signals transmitted from the first and second wireless devices, respectively. This comparing operation may be performed by the determining module 700B, and as illustrated in action 402 and/or action 604.

The network node 700 is further configured to initiate transmission of an LBT-related message to the first wireless device, where the LBT-related message comprises compatibility information indicating that the first and second wireless devices are compatible or incompatible at the serving network node, as a basis for the second wireless device to decide whether to perform a transmission or not. This initiating operation may be performed by an initiating module 700C in the network node 700, and as illustrated in actions 406 and 614. The initiating module 700C could alternatively be named a transmitting module, instructing module or message module.

It was mentioned above that the network node described herein may be implemented and comprised in said serving network node alone. In that case, the modules 700A-C in FIG. 7 would all be implemented in that serving network node. It was also mentioned above that the network node may alternatively be implemented in a distributed manner, e.g. as shown in FIG. 3A, so that it is comprised partly in a serving network node 300A which would then be configured to transmit the LBT-related message, and partly in a control node 300B which would then be configured to determine whether the first and second wireless devices are incompatible or not. In more detail, the detecting module 700A could in this case be implemented in the serving network node 300A while the determining module 700B and the initiating module 700C could be implemented in the control node 300B. The initiating module 700C would then in the latter implementation be configured to instruct the serving network node 300A to transmit the LBT-related message.

The wireless device 702 is arranged to handle interference in a wireless network where a Listen-Before-Talk, LBT, scheme is employed to control transmissions. The wireless device 702 is configured to detect an LBT-related message transmitted by a serving network node to another wireless device being served by the serving network node. The detected LBT-related message comprises compatibility information indicating that said wireless device 702 and the other wireless device are compatible or incompatible at the serving network node. This operation may be performed by a detecting module 702A in the wireless device 702, and as illustrated in action 500.

The wireless device 702 is further configured to decide to perform a transmission when the compatibility information indicates that said wireless devices are compatible at the serving network node. This operation may be performed by a deciding module 702B in the wireless device 702, and as illustrated in action 504. The wireless device 702 is further configured to decide to refrain from transmission when the compatibility information indicates that said wireless devices are incompatible at the serving network node. This operation may be performed also by the deciding module 702B, as illustrated by action 506. The deciding module 702B could alternatively be named a logic module or a transmission control module.

It should be noted that FIG. 7 illustrates various functional modules in the network node 700 and the wireless device 702, respectively, and the skilled person is able to implement these functional modules in practice using suitable software and hardware equipment. Thus, the solution is generally not limited to the shown structures of the network node 700 and the wireless device 702, and the functional modules therein may be configured to operate according to any of the features, examples and embodiments described in this disclosure, where appropriate.

The functional modules 700A-C and 702A-B described above may be implemented in the network node 700 and the wireless device 702, respectively, by means of program modules of a respective computer program comprising code means which, when run by the processor P causes the network node 700 and the wireless device 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 700 and the wireless device 702 in the form of a memory having a computer readable medium and being connected to the processor P. The computer program product or memory M in each of the network node 700 and the wireless device 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 700 and wireless device 702.

The solution described herein may be implemented in each of the network node 700 and the wireless device 702 by a computer program 700D, 702C comprising instructions which, when executed on at least one processor, cause the at least one processor to carry out the actions according to any of the above embodiments and examples, where appropriate. The solution may also be implemented at each of the network node 700 and the wireless device 702 in a carrier containing the above computer program, wherein the carrier is one of an electronic signal, an optical signal, a radio signal, or a computer readable storage product 700E, 702D.

While the solution has been described with reference to specific exemplifying embodiments, the description is generally only intended to illustrate the inventive concept and should not be taken as limiting the scope of the solution. For example, the terms "network node", "wireless device", "Listen-Before-Talk LBT scheme", "compatibility information", "reference signals" and "compatibility matrix" have been used throughout this disclosure, although any other corresponding entities, functions, and/or parameters could also be used having the features and characteristics described here. The solution is defined by the appended claims.

The invention claimed is:

1. A method performed by a serving network node in a radio access network (RAN) for handling interference in a wireless network where a Listen-Before-Talk (LBT) scheme is employed to control transmissions between the serving network node and wireless devices, the method comprising:
   determining whether a first wireless device being served by the serving network node is compatible with a second wireless device at the serving network node so that uplink signals transmitted from the first and second wireless devices are spatially separable at the serving network node; and
   initiating transmission of an LBT-related message from the serving network node to the first wireless device, the LBT-related message comprising compatibility information that explicitly indicates that the first and second wireless devices are incompatible at the serving network node, as a basis for the second wireless device to decide not to perform a transmission.

2. The method of claim 1, wherein the determining is performed after detecting uplink signals transmitted from the first wireless device and uplink signals transmitted from the second wireless device.

3. The method of claim 2, wherein the determining is performed by comparing an Angle-of-Arrival for the detected uplink signals transmitted from the first and second wireless devices, respectively.

4. The method of claim 2, wherein the detected uplink signals include reference signals transmitted by the first and second wireless devices.

5. The method of claim 1, wherein the determining is performed when received power of the uplink signals transmitted from the second wireless device is above a predefined power threshold.

6. The method of claim 1, wherein the first and second wireless devices are served in different cells.

7. The method of claim 1, wherein a compatibility matrix is created and maintained at the serving network node, the compatibility matrix indicating whether different pairs of wireless devices are compatible or incompatible at the serving network node.

8. The method of claim 7, wherein the compatibility matrix is maintained based on reference signals transmitted periodically by the wireless devices.

9. A serving network node in a radio access network (RAN) configured to handle interference in a wireless network where a Listen-Before-Talk (LBT) scheme is employed to control transmissions between the serving network node and wireless devices, the network node comprising:
processing circuitry;
memory containing instructions executable by the processing circuitry whereby the network node is operative to:
determine whether a first wireless device being served by the serving network node is compatible with a second wireless device at the serving network node so that uplink signals transmitted from the first and second wireless devices are spatially separable at the serving network node; and
initiate transmission of an LBT-related message from the serving network node to the first wireless device, the LBT-related message comprising compatibility information that explicitly indicates that the first and second wireless devices are incompatible at the serving network node, as a basis for the second wireless device to decide not to perform a transmission.

10. The network node of claim 9, wherein the instructions are such that the network node is operative to perform the determining after detecting uplink signals transmitted from the first wireless device and uplink signals transmitted from the second wireless device.

11. The network node of claim 10, wherein the instructions are such that the network node is operative to perform the determining by comparing an Angle-of-Arrival for the detected uplink signals transmitted from the first and second wireless devices, respectively.

12. The network node of claim 10, wherein the detected uplink signals include reference signals transmitted by the first and second wireless devices.

13. The network node of claim 9, wherein the instructions are such that the network node is operative to perform the determining when received power of the uplink signals transmitted from the second wireless device is above a predefined power threshold.

14. The network node of claim 9, wherein the first and second wireless devices are served in different cells.

15. The network node of claim 9, wherein the instructions are such that the network node is operative to create and maintain a compatibility matrix at the serving network node, the compatibility matrix indicating whether different pairs of wireless devices are compatible or incompatible at the serving network node.

16. The network node of claim 15, wherein the instructions are such that the network node is operative to maintain the compatibility matrix based on reference signals transmitted periodically by the wireless devices.

17. A method, performed by a first wireless device, for handling interference in a wireless network where a Listen-Before-Talk (LBT) scheme is employed to control transmissions, the method comprising:
detecting an LBT-related message transmitted by a serving network node in a radio access network (RAN) to a second wireless device being served by the serving network node, the LBT-related message comprising compatibility information that explicitly indicates that the first and second wireless devices are incompatible at the serving network node; and
deciding to refrain from transmission in response to the compatibility information indicating that the first and second wireless devices are incompatible at the serving network node.

18. A first wireless device configured to handle interference in a wireless network where a Listen-Before-Talk (LBT) scheme is employed to control transmissions, the first wireless device comprising:
processing circuitry;
memory containing instructions executable by the processing circuitry whereby the first wireless device is operative to:
detect an LBT-related message transmitted by a serving network node in a radio access network (RAN) to a second wireless device being served by the serving network node, the LBT-related message comprising compatibility information that explicitly indicates that the first and second wireless devices are incompatible at the serving network node; and
decide to refrain from transmission in response to the compatibility information indicating that the first and second wireless devices are incompatible at the serving network node.

* * * * *